(12) United States Patent
Koo

(10) Patent No.: US 11,213,902 B2
(45) Date of Patent: Jan. 4, 2022

(54) BROACHING MACHINE AND LATHE COMPRISING SAME

(71) Applicant: DOOSAN MACHINE TOOLS CO., LTD., Changwon-si (KR)

(72) Inventor: Gun-Mo Koo, Gimhae-si (KR)

(73) Assignee: DOOSAN MACHINE TOOLS CO., LTD., Changwon-si (KR)

( * ) Notice: Subject to any disclaimer, the term of this patent is extended or adjusted under 35 U.S.C. 154(b) by 0 days.

(21) Appl. No.: 16/480,100

(22) PCT Filed: Jan. 25, 2018

(86) PCT No.: PCT/KR2018/001094
§ 371 (c)(1),
(2) Date: Jul. 23, 2019

(87) PCT Pub. No.: WO2018/143606
PCT Pub. Date: Aug. 9, 2018

(65) Prior Publication Data
US 2019/0375031 A1     Dec. 12, 2019

(30) Foreign Application Priority Data
Jan. 31, 2017 (KR) .......................... 10-2017-0013541

(51) Int. Cl.
*B23D 37/04* (2006.01)
*B23D 41/08* (2006.01)
*B23D 43/02* (2006.01)

(52) U.S. Cl.
CPC ............. *B23D 37/04* (2013.01); *B23D 41/08* (2013.01); *B23D 43/02* (2013.01)

(58) Field of Classification Search
CPC ......... B23D 37/04; B23D 41/08; B23D 43/02
See application file for complete search history.

(56) References Cited

U.S. PATENT DOCUMENTS

| 1,319,482 A | 10/1919 | Mayoh |
| 2,315,476 A * | 3/1943 | Groene ................. B23D 37/04 409/261 |

(Continued)

FOREIGN PATENT DOCUMENTS

| CN | 203448763 U | 2/2014 |
| CN | 204397051 U | 6/2015 |

(Continued)

OTHER PUBLICATIONS

English translation of KR 101620327 B1 (Year: 2016).*

(Continued)

*Primary Examiner* — Alan Snyder
(74) *Attorney, Agent, or Firm* — STIP Law Group, LLC

(57) ABSTRACT

A broaching machine may include a broaching tool and a moving mechanism. The broaching tool may be movably arranged in a spindle of a lathe in a horizontal direction to machine a workpiece fixed to a chucking mechanism of the lathe. The moving mechanism may move the broaching tool in the horizontal direction. Thus, a process for forming a hole through the workpiece using the lathe and a process for machining the inner surface of the hole using the broaching machine may be continuously performed so that a time for machining the workpiece may be remarkably reduced. Further, the process for forming the hole through the workpiece using the lathe and the process for machining the inner surface of the hole using the broaching machine may be continuously performed on the workpiece fixed to the chucking mechanism to suppress dimension failures of the workpiece.

9 Claims, 14 Drawing Sheets

(56) References Cited

U.S. PATENT DOCUMENTS

| | | | | |
|---|---|---|---|---|
| 3,666,279 A | * | 5/1972 | Coope | B23B 31/207 |
| | | | | 279/50 |
| 5,615,467 A | | 4/1997 | Simmons et al. | |
| 2008/0118322 A1 | * | 5/2008 | Kress | B23D 43/005 |
| | | | | 409/244 |

FOREIGN PATENT DOCUMENTS

| | | |
|---|---|---|
| DE | 326393 C | 9/1920 |
| DE | 2516631 A1 | 10/1976 |
| DE | 3411352 A1 | 10/1985 |
| JP | 58-192713 A | 11/1983 |
| JP | 2012-131001 A | 7/2012 |
| KR | 20-0360393 Y1 | 8/2004 |
| KR | 10-2013-0072391 A | 7/2013 |
| KR | 10-1381741 B1 | 4/2014 |
| KR | 10-1620327 B1 | 5/2016 |
| KR | 101620327 B1 * | 5/2016 |
| KR | 10-2016-0072569 A | 6/2016 |
| WO | 2008/105040 A1 | 9/2009 |

OTHER PUBLICATIONS

International Search Report dated Jul. 17, 2018, corresponding to International Application No. PCT/KR2018/001094 citing the above reference(s).
The extended European Search Report dated Oct. 1, 2020 in connection with the counterpart European Patent Application No. 18747219.6, citing the above reference(s).

\* cited by examiner

BROACHING MACHINE AND LATHE COMPRISING SAME

CROSS REFERENCE TO RELATED APPLICATION

This present application is a national stage filing under 35 U.S.C § 371 of PCT application number PCT/KR2018/001094 filed on Jan. 25, 2018 which is based upon and claims the benefit of priority to Korean Patent Application No. 10-2017-0013541 filed on Jan. 31, 2017 in the Korean Intellectual Property Office. The disclosures of the above-listed applications are hereby incorporated by reference herein in their entirety.

BACKGROUND

1. Field

Example embodiments relate to a broaching machine and a lathe including the same. More particularly, example embodiments relate to a broaching machine for machining an inner surface of a workpiece, and a lathe including the broaching machine.

2. Description of the Related Art

Generally, a lathe may be used for forming a hole through a workpiece. Particularly, a broaching machine may be used for forming a special shape on an inner surface of the hole.

According to related arts, the broaching machine may be separated from the lathe. Thus, a time for forming the hole and for machining the special shape on the inner surface of the hole may be increased. Further, because the workpiece may be transferred from the lathe to the broaching machine, it may be difficult to accurately fix the workpiece to the broaching machine. Therefore, a machined workpiece may have a dimension different from a designed dimension.

SUMMARY

Example embodiments provide a broaching machine that may be capable of cutting down a machining time of a workpiece and preventing a dimension failure of the workpiece.

Example embodiments also provide a lathe including the above-mentioned broaching machine.

According to example embodiments, there may be provided a broaching machine. The broaching machine may include a broaching tool and a moving mechanism. The broaching tool may be movably arranged in a spindle of a lathe in a horizontal direction to machine a workpiece fixed to a chucking mechanism of the lathe. The moving mechanism may move the broaching tool in the horizontal direction.

In example embodiments, the moving mechanism may include a moving block and an actuator. The moving block may be fixed to the broaching tool. The actuator may be arranged opposite to the chucking mechanism with respect to the spindle to horizontally move the moving block.

In example embodiments, the moving mechanism may further include a spring for returning the moving block, which may be moved toward the workpiece by the actuator, to an original position.

In example embodiments, the moving mechanism may further include a fixing block supported by the lathe. The spring is fixed to the fixing block.

In example embodiments, the broaching machine may further include a supporting block configured to support an end of the broaching tool.

In example embodiments, the supporting block may include a supporting groove and a supporting boss. The supporting groove may be horizontally formed at the supporting block to receive the end of the broaching tool. The supporting boss may be formed on an inner surface of the supporting groove. The supporting boss may be inserted into a receiving groove formed at an outer surface of the end of the broaching tool.

In example embodiments, the supporting block may be installed at a tool post of the lathe.

In example embodiments, the broaching machine may further include a cutting fluid-supplying mechanism for supplying a cutting fluid to the broaching tool.

In example embodiments, the cutting fluid-supplying mechanism may include a pump, an inlet port and a cutting fluid line. The pump may discharge the cutting fluid. The inlet port may be installed at the moving mechanism to receive the cutting fluid discharged from the pump. The cutting fluid line may be extended from the inlet port into the broaching tool through the moving mechanism.

According to example embodiments, there may be provided a lathe. The lathe may include a spindle, a chucking mechanism, a tool post, a broaching tool and a moving mechanism. The spindle may be configured to rotate a workpiece. The chucking mechanism may be installed in the spindle to chuck the workpiece. At least one tool for forming a hole through the workpiece may be installed at the tool post. The broaching tool may be movably arranged in the spindle along a horizontal direction to machine an inner surface of the hole in the workpiece. The moving mechanism may move the broaching tool in the horizontal direction.

In example embodiments, the chucking mechanism may include a collet, a push pipe and a toggle lever. The collet may be arranged in the spindle to chuck the workpiece. The push pipe may be arranged in the spindle to operate the collet. The toggle lever may be arranged on an outer surface of the spindle to move the push pipe.

According to example embodiments, the broaching machine may be integrally provided to the lathe. Thus, a process for forming a hole through the workpiece using the lathe and a process for machining the inner surface of the hole using the broaching machine may be continuously performed so that a time for machining the workpiece may be remarkably reduced. Further, the process for forming the hole through the workpiece using the lathe and the process for machining the inner surface of the hole using the broaching machine may be continuously performed on the workpiece fixed to the chucking mechanism to suppress dimension failures of the workpiece.

BRIEF DESCRIPTION OF THE DRAWINGS

Example embodiments will be more clearly understood from the following detailed description taken in conjunction with the accompanying drawings.

FIG. 1 is a perspective view illustrating a lathe including a broaching machine in accordance with example embodiments;

FIG. 2 is a cross-sectional view illustrating the lathe in FIG. 1;

FIGS. 3 and 4 are perspective views illustrating the broaching machine in FIG. 1;

FIG. 5 is a cross-sectional view illustrating a broaching tool of the broaching machine in FIG. 3;

FIG. 6 is a cross-sectional view illustrating a supporting block for supporting the broaching tool in FIG. 3;

FIG. 7 is an enlarged cross-sectional view of a portion "VII" in FIG. 6;

FIG. 8 is a perspective view illustrating a pump for supplying a cutting fluid to the broaching machine in FIG. 1;

FIGS. 9 and 10 are cross-sectional views illustrating operations for supplying and discharging a cutting fluid into the broaching machine in FIG. 1; and FIGS. 11 to 14 are cross-sectional views illustrating operations for chucking a workpiece by a chucking mechanism of the lathe in FIG. 1.

DETAILED DESCRIPTION OF THE EMBODIMENTS

Figure 1:
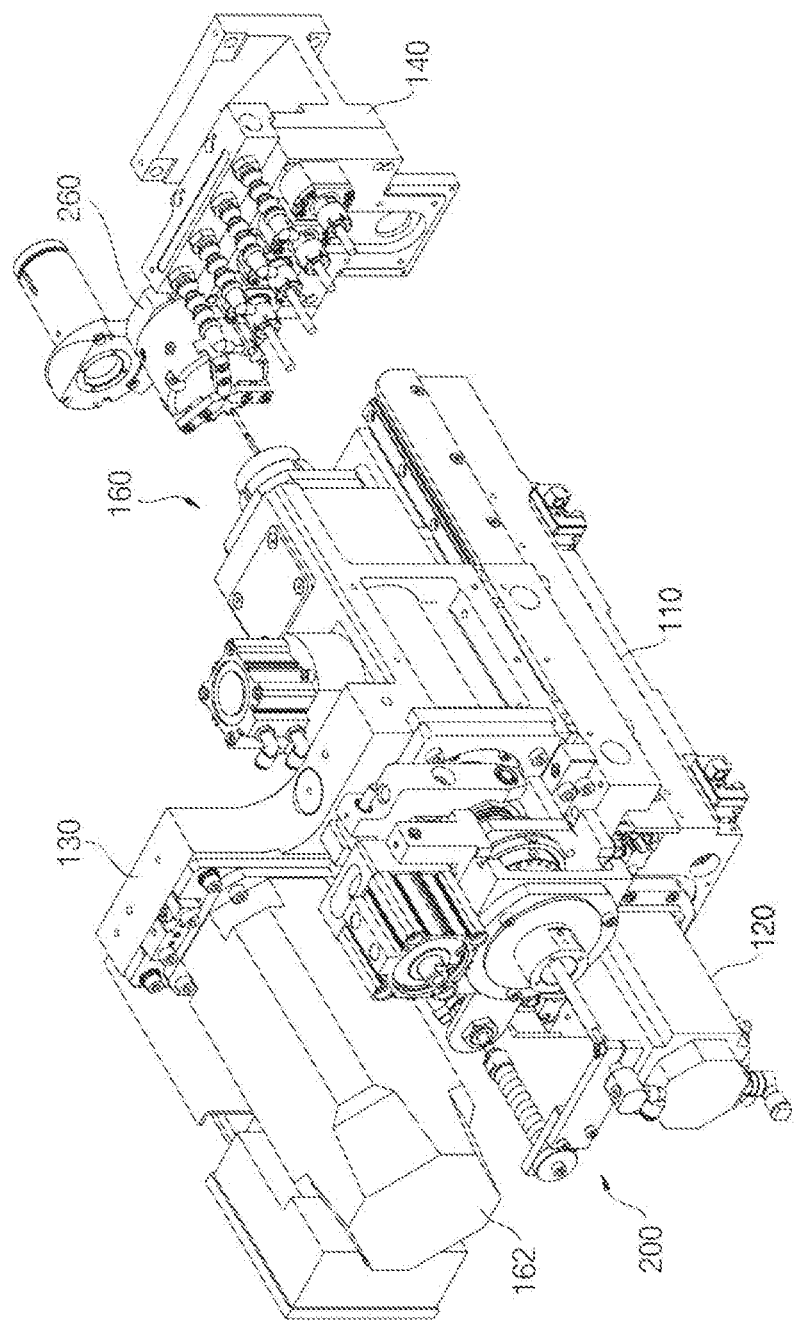
FIGS. 1 to 14 represent non-limiting, example embodiments as described herein.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
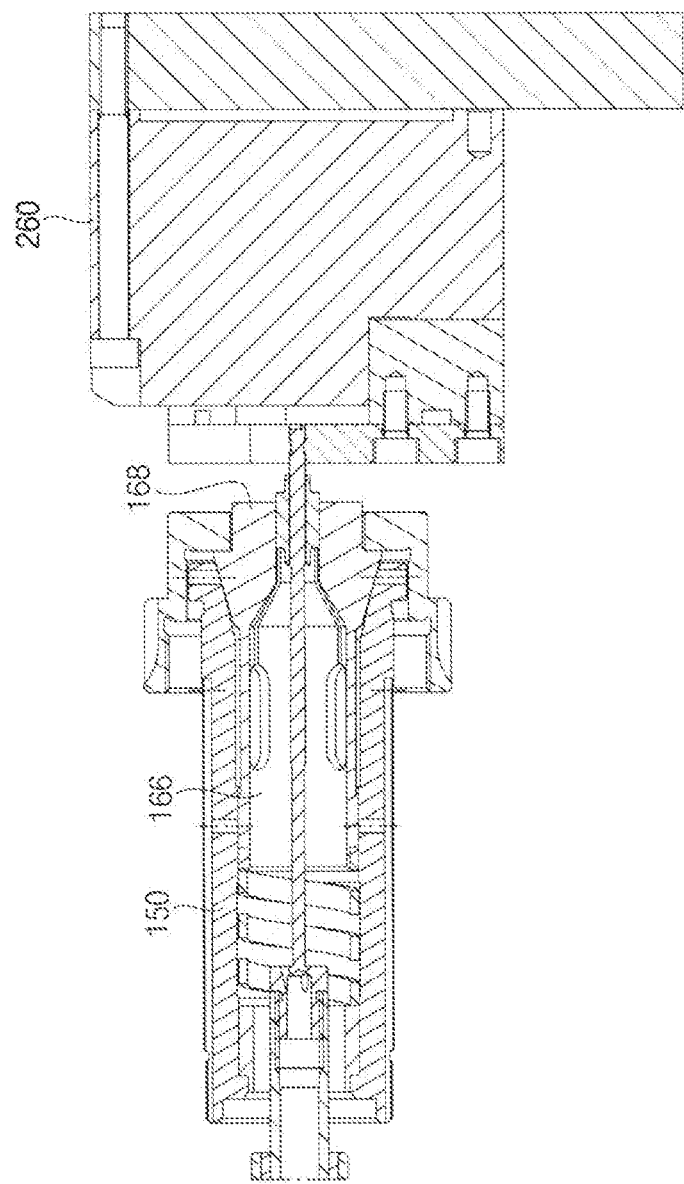

FIG. 1 is a perspective view illustrating a lathe including a broaching machine in accordance with example embodiments, and FIG. 2 is a cross-sectional view illustrating the lathe in FIG. 1.

Referring to FIGS. 1 and 2, a lathe of this example embodiment may include a table 110, an actuator 120, a housing 130, a tool post 140, a spindle 150, a chucking mechanism 160 and a broaching machine 200. In example embodiments, the lathe may include a horizontal lathe.

The actuator 120 may be installed at the table 110. The actuator 120 may generate a rotary force with respect to a horizontal direction. The rotary force generated from the actuator 120 may be transferred to the spindle 150. In example embodiments, the actuator 120 may include a cylinder, a motor, etc.

The housing 130 may be movably arranged on an upper surface of the table 110. The housing 130 may be moved in the horizontal direction.

The tool post 140 may be arranged opposite to the table 110. The tool post 140 may clamp tools for machining a workpiece, for example, for forming a hole through the workpiece.

The spindle 150 may be rotatably arranged in the housing 130. The spindle 150 may receive the rotary force from the actuator 120 to rotate the workpiece with respect to the horizontal direction.

The chucking mechanism 160 may be configured to chuck the workpiece. The chucking mechanism 160 may include an actuator 162, a toggle lever 164, a push pipe 166 and a collet 168.

The actuator 162 may be installed at the housing 130. The actuator 162 may generate a linear force along the horizontal direction.

The toggle lever 164 may be arranged on an outer surface of the spindle 150. The toggle lever 164 may change a direction of the linear force generated from the actuator 162 into an opposite direction.

The push pipe 166 may be movably arranged in the spindle 150. The push pipe 166 may be horizontally moved by the rotation of the toggle lever 164.

The collet 168 may be arranged in the spindle 150. The collet 168 may chuck the workpiece by horizontally moving the push pipe 166.

Figure 3:
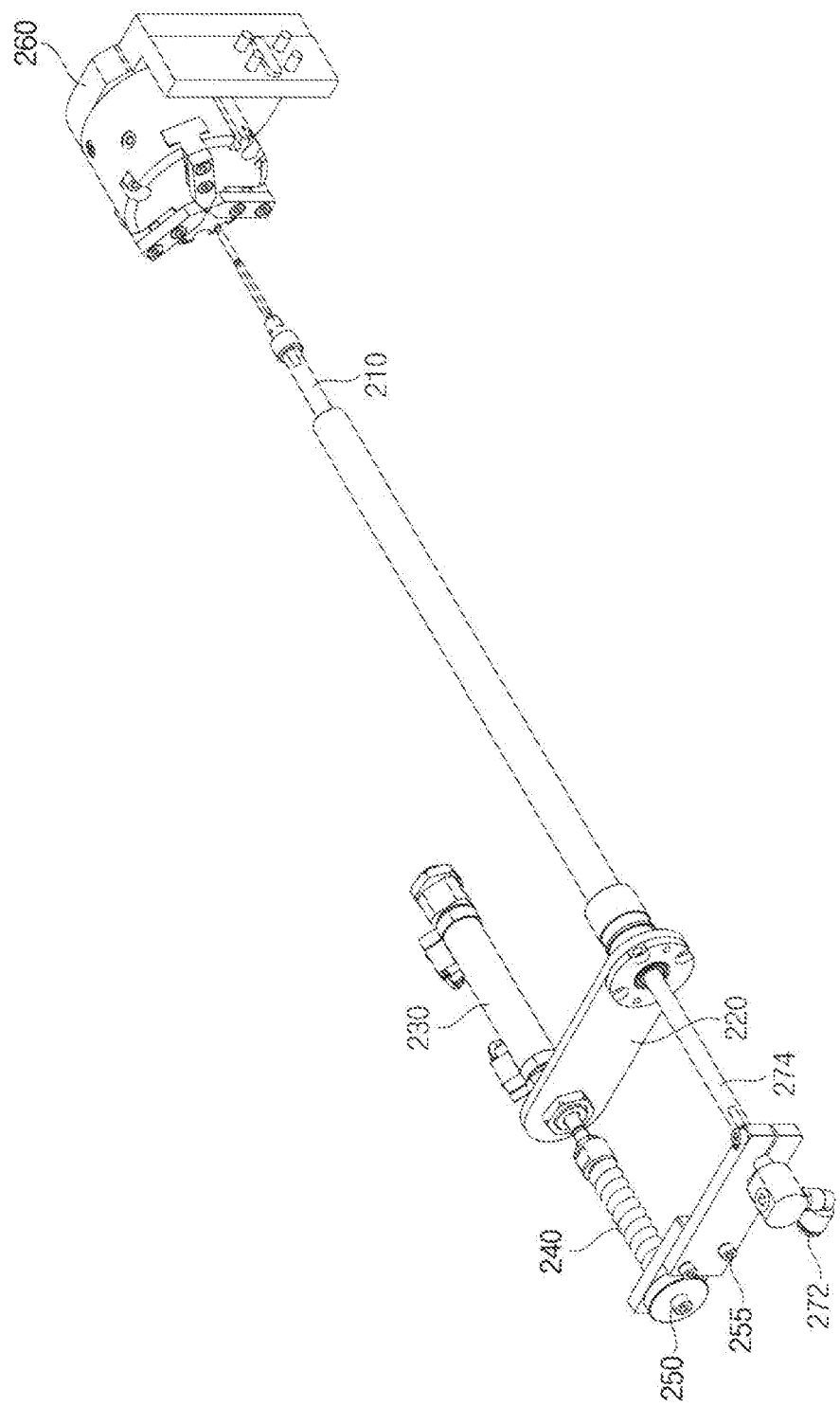
Figure 4:
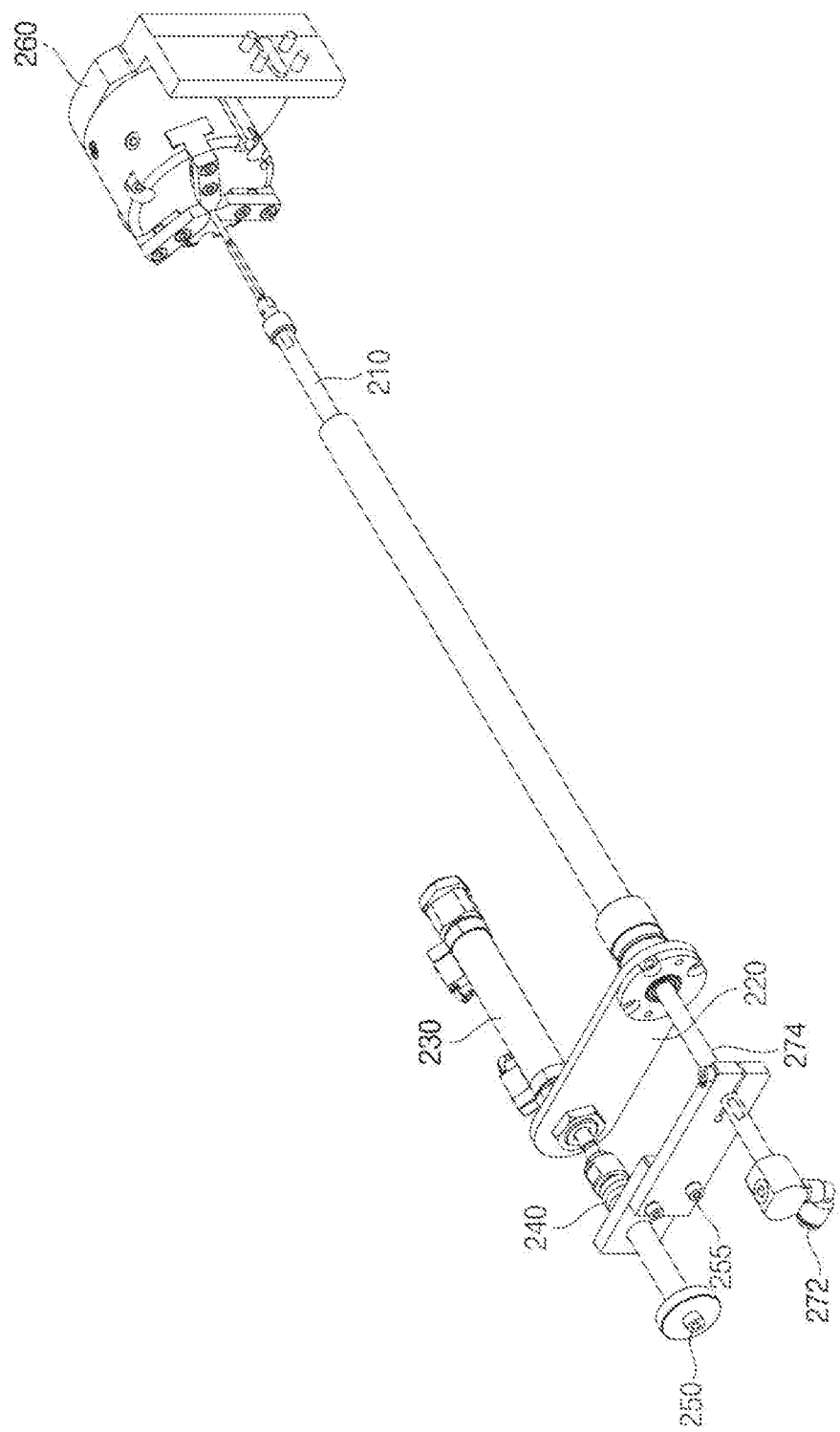
Figure 5:
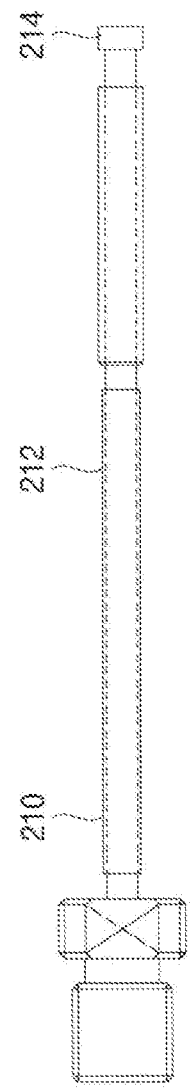
Figure 6:
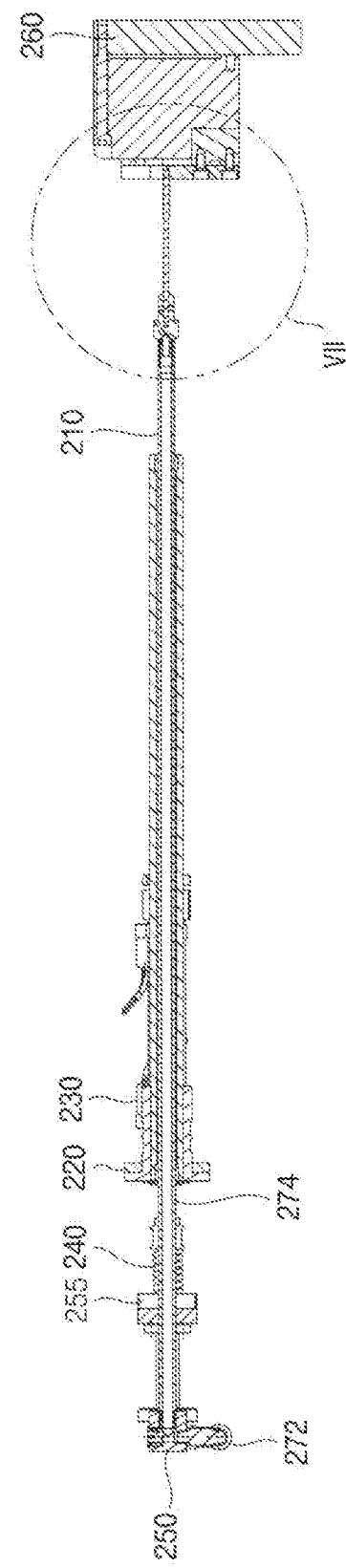
Figure 7:
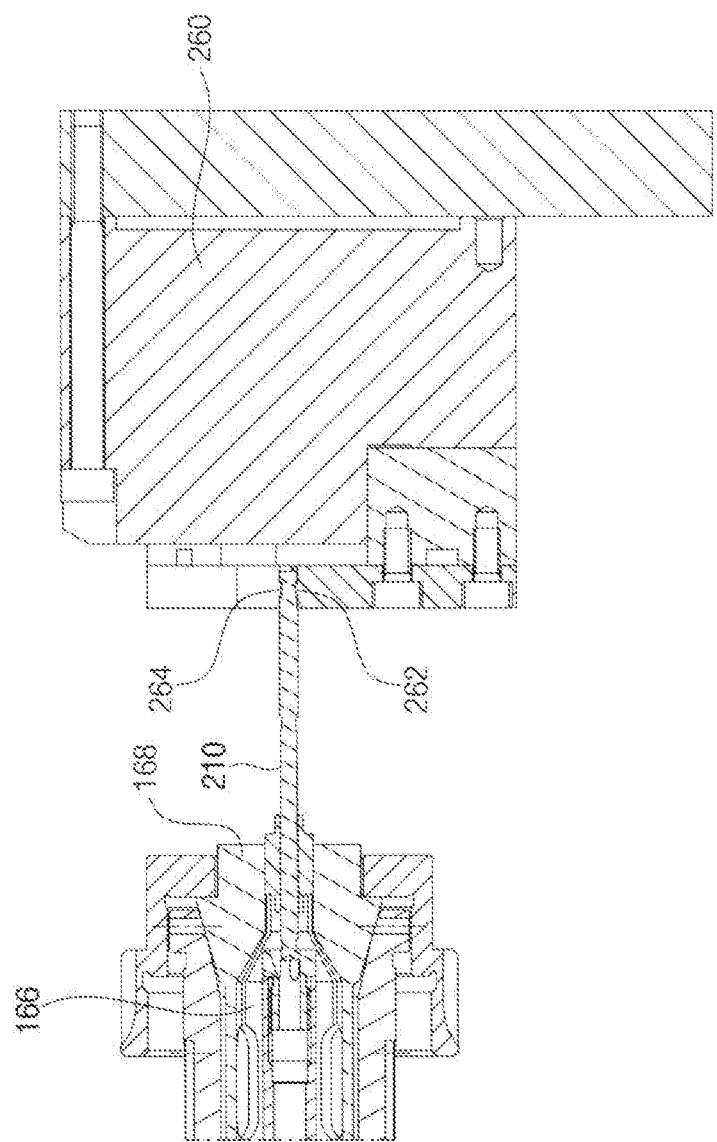

FIGS. 3 and 4 are perspective views illustrating the broaching machine in FIG. 1, FIG. 5 is a cross-sectional view illustrating a broaching tool of the broaching machine in FIG. 3, FIG. 6 is a cross-sectional view illustrating a supporting block for supporting the broaching tool in FIG. 3, and FIG. 7 is an enlarged cross-sectional view of a portion "VII" in FIG. 6.

Referring to FIGS. 3 to 7, the broaching machine 200 may include a broaching tool 210, a moving mechanism and a supporting block 260.

The broaching tool 210 may be movably arranged in the spindle 150 along the horizontal direction. The broaching tool 210 may have a first end oriented toward the tool post 140, and a second end opposite to the first end. The broaching tool 210 may have a tapered portion 212 configured to machine an inner surface of the hole in the workpiece. The tapered portion 212 may be positioned at a central portion of the broaching tool 210. The broaching tool 210 may further include a supporting groove 214. The supporting groove 214 may be formed at an outer surface of the first end of the broaching tool 210.

The moving mechanism may move the broaching tool 210 in the horizontal direction. The moving mechanism may be positioned at a region opposite to the chucking mechanism 160 with respect to the spindle 150. That is, the moving mechanism and the chucking mechanism 160 may be arranged at both sides of the spindle 150. The tapered portion 212 of the broaching tool 210 may be horizontally moved to machine the inner surface of the hole in the workpiece. The moving mechanism may include a moving block 220, an actuator 230, a spring 240, a spring shaft 250 and a fixing block 255.

The second end of the broaching tool 210 may be connected to the moving block 220. The second end of the broaching tool 210 may be fixed to a right portion of a right surface of the moving block 220.

The actuator 230 may be installed at a left portion of the right surface of the moving to block 220. That is, the actuator 230 may be positioned at the region opposite to the chucking mechanism 160 with respect to the spindle 150. Thus, when the actuator 230 may generate a driving force in a left direction, the moving block 220 and the broaching tool 210 may be moved in the left direction.

The fixing block 255 may be arranged opposite to the moving block 220. The fixing block 255 may be fixed to the table 110.

The spring shaft 250 may have one end fixed to the moving block 220, and the other end movably inserted into the fixing block 255. The spring 240 may be arranged on an outer surface of the spring shaft 250. The spring 250 may provide the moving block 220 with a returning force to return the broaching tool 210 to an original position.

The supporting block 260 may be configured to support the first end of the broaching tool 210. The supporting block 260 may support the first end of the broaching tool 210 to prevent a slip and a deflection of the broaching tool 210.

The supporting block 260 may have a receiving groove 262 configured to receive the first end of the broaching tool 210. The receiving groove 262 may be formed in the supporting block 260 in the horizontal direction. A supporting boss 264 may be formed on an inner surface of the receiving groove 22. The supporting boss 264 may be inserted into the supporting groove 214 of the broaching tool 210. Thus, when the supporting boss 264 may be inserted into the supporting groove 214, the supporting block 260 may firmly support the first end of the broaching tool 210.

Figure 8:
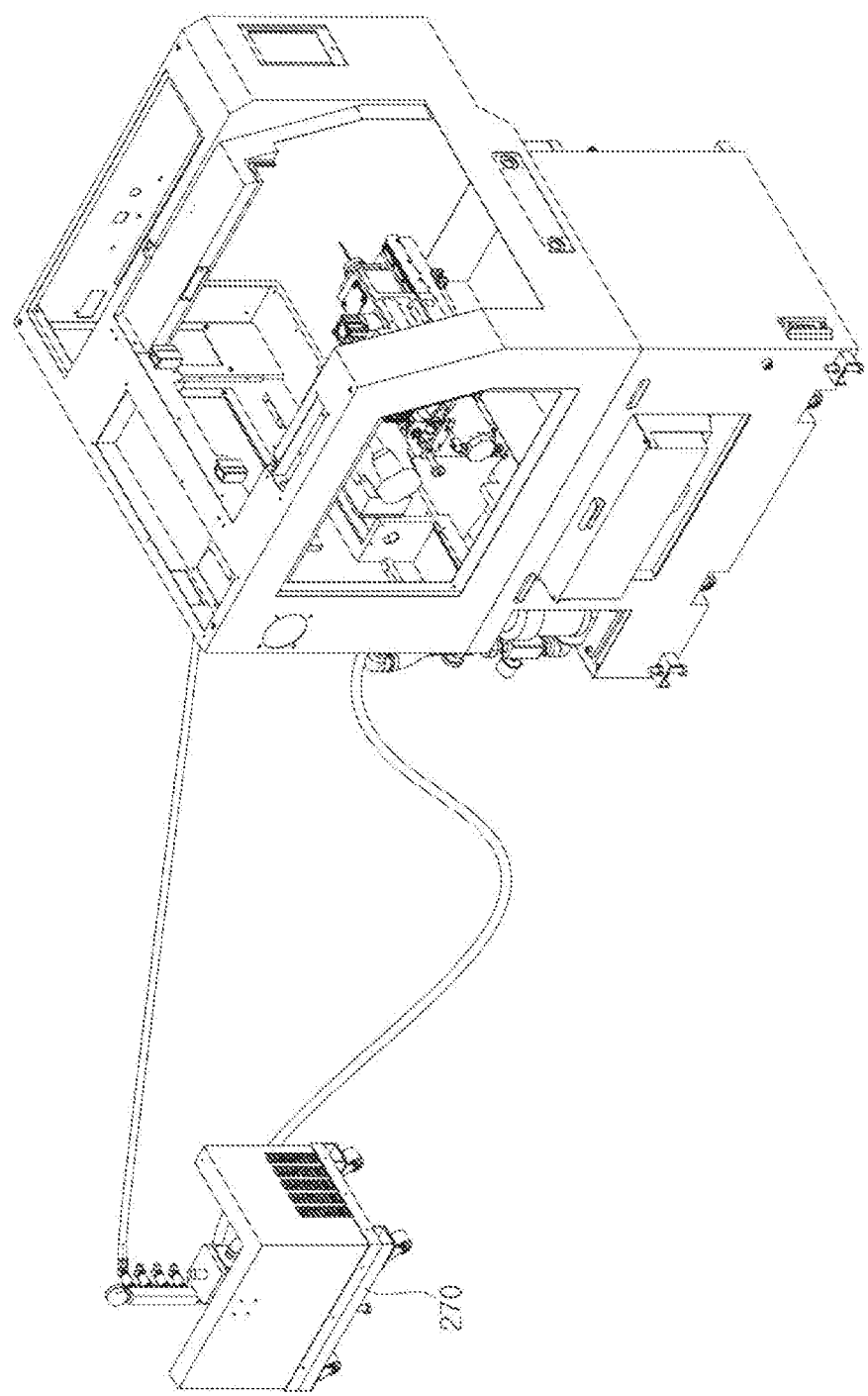
Figure 9:
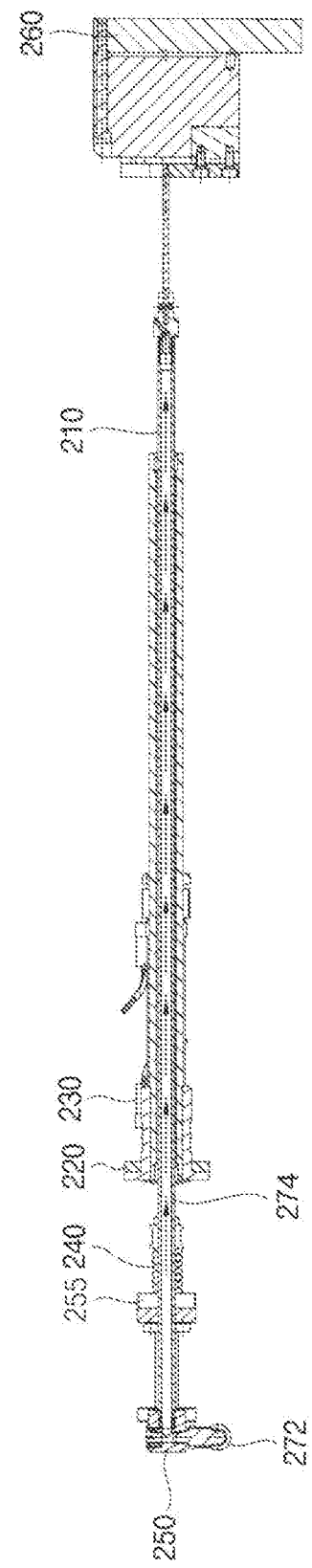
Figure 10:
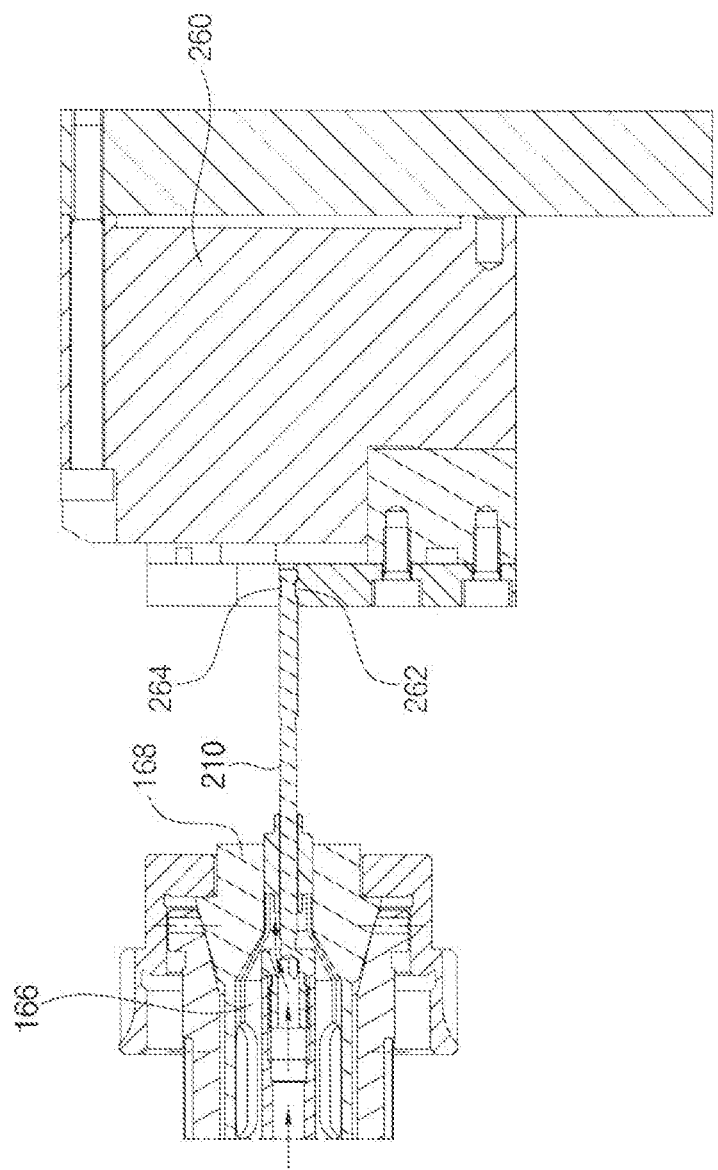

FIG. 8 is a perspective view illustrating a pump for supplying a cutting fluid to the broaching machine in FIG. 1, and FIGS. 9 and 10 are cross-sectional views illustrating operations for supplying and discharging a cutting fluid into the broaching machine in FIG. 1.

Referring to FIGS. 8 to 10, the broaching machine 200 may further include a cutting fluid-supplying mechanism.

The cutting fluid-supplying mechanism may include a pump 270, an inlet port 272 and a cutting fluid line 274. The pump 270 may discharge a cutting fluid toward the inlet port 272. Thus, the pump 270 may be connected with the inlet port 272 through a tube.

The inlet port 272 may be installed at the fixing block 255. The cutting fluid line 274 may be extended from the inlet port 272 along an internal space of the broaching tool 210. When the workpiece may be unclamped from the collet 168, the cutting fluid supplied to the broaching tool 210 may be drained between the collet 168 and the unclamped workpiece.

FIGS. 11 to 14 are cross-sectional views illustrating operations for chucking a workpiece by a chucking mechanism of the lathe in FIG. 1.

Figure 11:
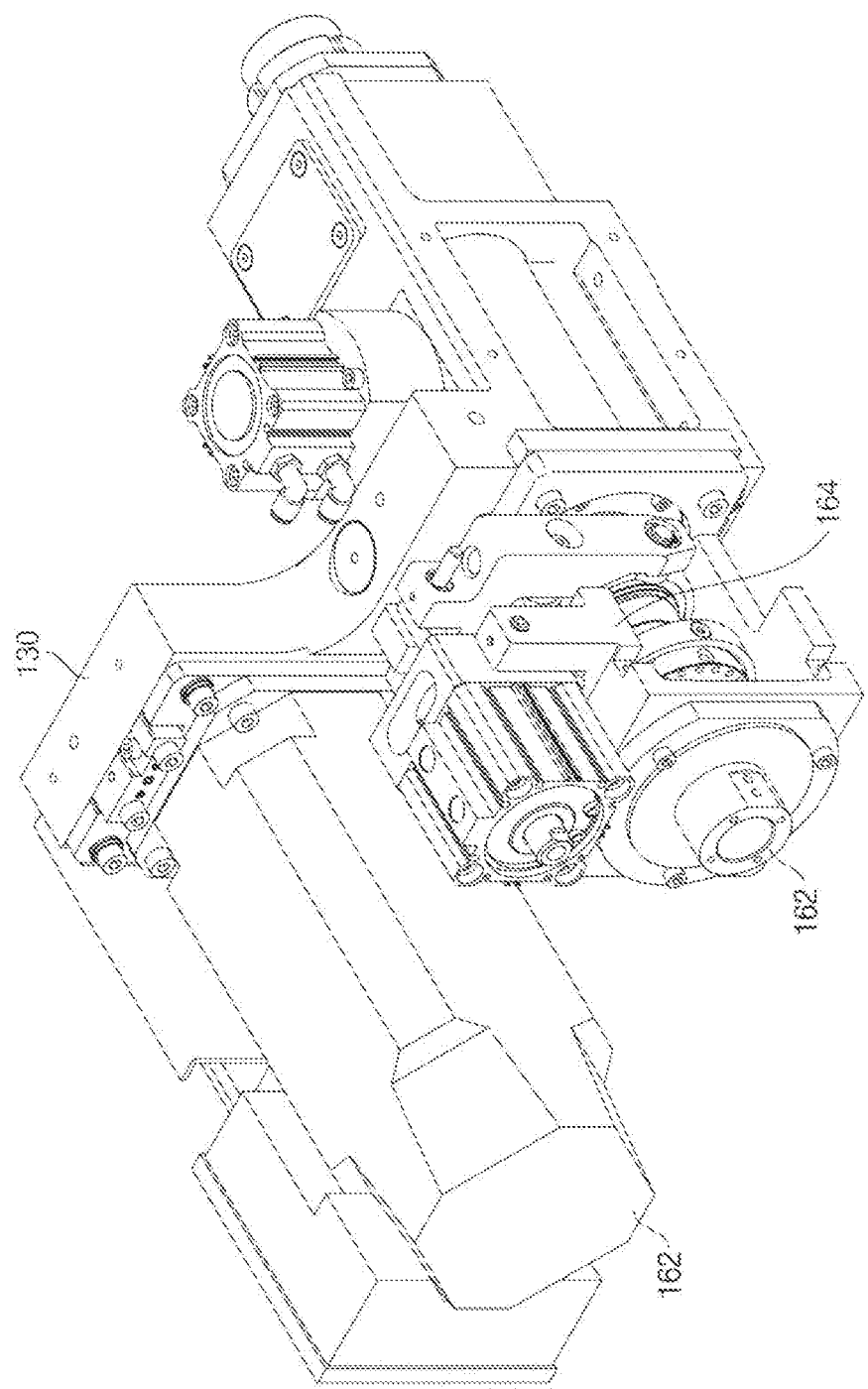

Referring to FIG. 11, the housing 130 may be forwardly moved on the table 110 in the horizontal direction.

Figure 12:
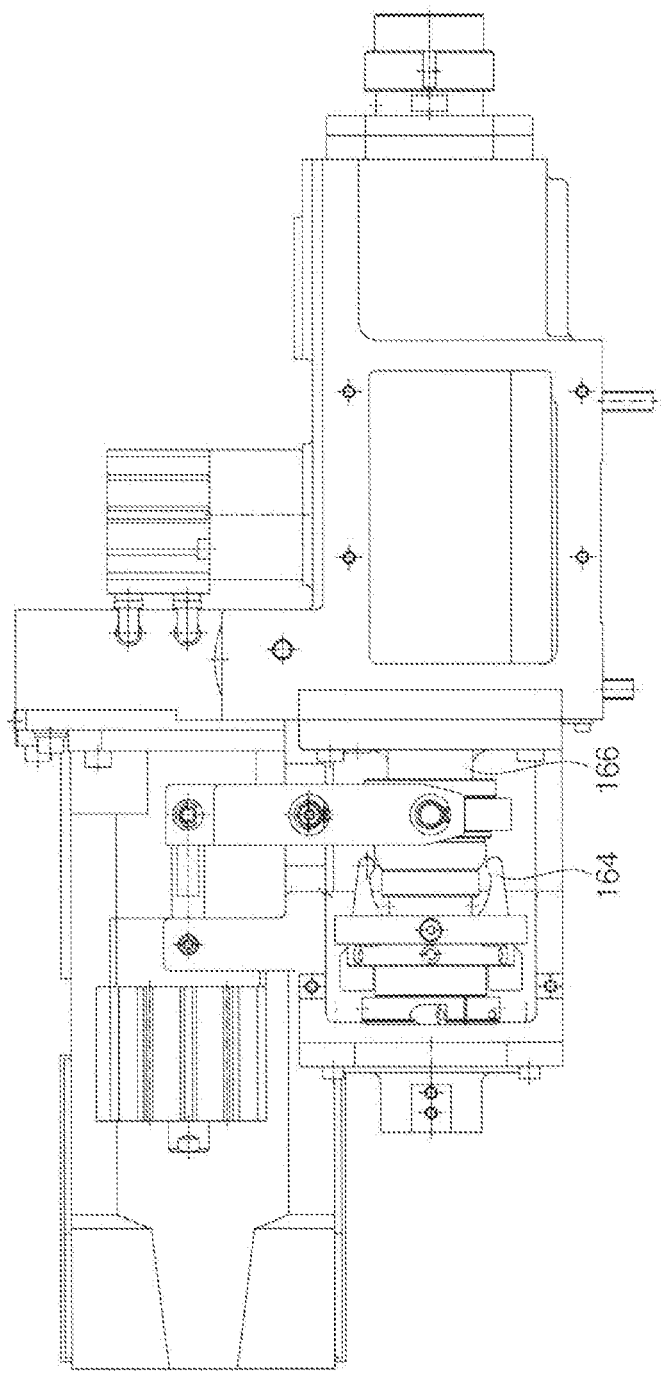

Referring to FIG. 12, the linear force of the actuator 162 may be transferred to the toggle lever 164. The toggle lever 164 may then change the direction of the linear force.

Figure 13:
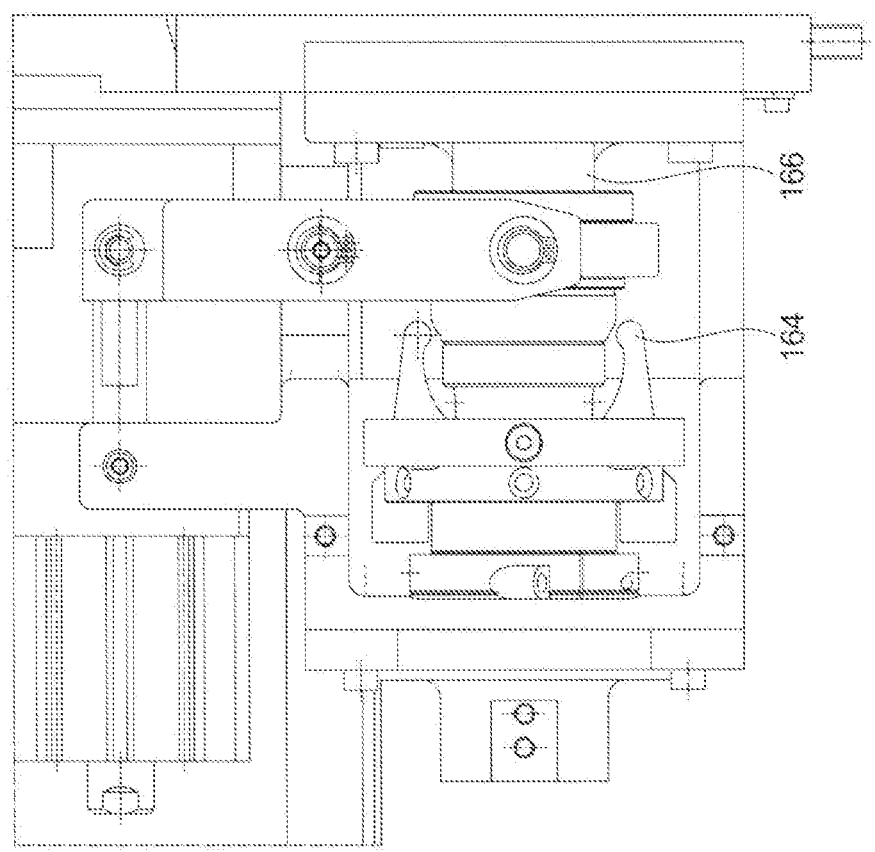

Referring to FIG. 13, when the toggle lever 164 may be rotated, the push pipe 166 may be forwardly moved in the horizontal direction.

Figure 14:
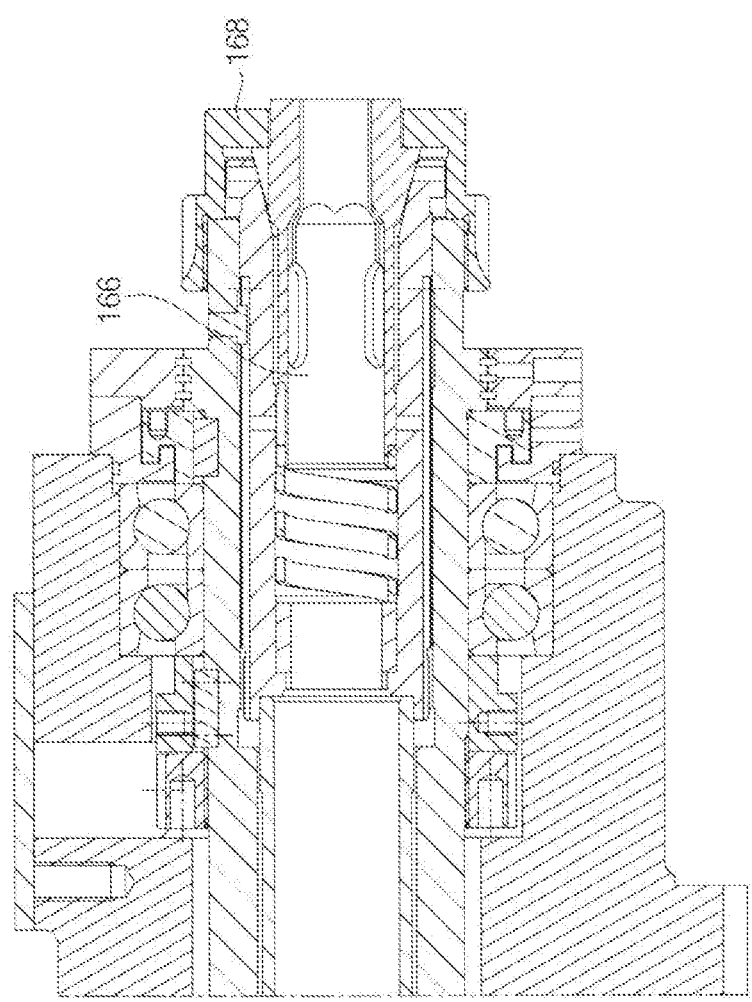

Referring to FIG. 14, the collet 168 may be closed by the forward movement of the push pipe 166 to chuck the workpiece.

The spindle 150 may be rotated with respect to the horizontal direction by the rotary force of the actuator 120. Thus, the workpiece fixed to the collet 168 may also be rotated with respect to the horizontal direction. The tool installed at the tool post 140 may machine the rotating workpiece to form a hole through the workpiece.

After forming the hole, the broaching machining process may be performed under a condition that the collet 168 may chuck the workpiece having the hole.

The pump 270 may supply the cutting fluid into the broaching tool 210 through the inlet port 272 and the cutting fluid line 274.

The spring 240 may be extended by the actuator 230 so that the moving block 220 may be forwardly moved. Therefore, the broaching tool 210 may also be forwardly moved so that the tapered portion 212 of the broaching tool 210 may machine the inner surface of the hole in the workpiece.

In the broaching machining process, the first end of the broaching tool 210 may be received in the receiving groove 262 of the supporting block 260. The supporting boss 264 of the supporting block 260 may be inserted into the supporting groove 214 of the broaching tool 210. Thus, during the broaching process using the broaching tool 210, the broaching tool 210 may not be slipped and deflected.

After completing the broaching process, the broaching tool 210 and the moving block 220 may be returned to the original position by the returning force of the spring 240. Further, when the chucking force of the collet 168 may be released, a gap may be generated between the collet 168 and the workpiece. Thus, the cutting fluid may be drained through the gap.

According to example embodiments, the broaching machine may be integrally provided to the lathe. Thus, a process for forming a hole through the workpiece using the lathe and a process for machining the inner surface of the hole using the broaching machine may be continuously performed so that a time for machining the workpiece may be remarkably reduced. Further, the process for forming the hole through the workpiece using the lathe and the process for machining the inner surface of the hole using the broaching machine may be continuously performed on the workpiece fixed to the chucking mechanism to suppress dimension failures of the workpiece.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A broaching machine comprising:
a broaching tool movably arranged in a spindle of a lathe along a horizontal direction to machine an inner surface of a hole in a workpiece fixed to a chucking mechanism of the lathe in the spindle, wherein the spindle is configured to rotate the workpiece; and
a moving mechanism for moving the broaching tool in the horizontal direction,
wherein the moving mechanism comprises:
a moving block fixed to the broaching tool;
an actuator arranged opposite to the chucking mechanism with respect to the spindle to move the moving block in the horizontal direction; and
a spring for returning the moving block, which is moved toward the workpiece by the actuator, to an original position.

2. The broaching machine of claim 1, wherein the moving mechanism further comprises a fixing block supported by the lathe and fixed to the spring.

3. The broaching machine of claim 1, further comprising a supporting block for supporting an end of the broaching tool.

4. The broaching machine of claim 3, wherein the supporting block comprises:
a supporting groove formed at the supporting block in the horizontal direction to receive the end of the broaching tool; and
a supporting boss formed on an inner surface of the supporting groove and inserted into a receiving groove at an outer surface of the end of the broaching tool.

5. The broaching machine of claim 3, wherein the supporting block is installed at a tool post of the lathe.

6. The broaching machine of claim 1, further comprising a cutting fluid-supplying mechanism for supplying a cutting fluid to the broaching tool.

7. The broaching machine of claim 6, wherein the cutting fluid-supplying mechanism comprises:
a pump for discharging the cutting fluid;
an inlet port installed at the moving mechanism to receive the cutting fluid discharged from the pump; and
a cutting fluid line extended from the inlet port into the broaching tool through the moving mechanism.

8. A lathe comprising:
a spindle configured to rotate a workpiece;
a chucking mechanism arranged in the spindle to chuck the workpiece;
a tool post configured to receive at least one tool for forming a hole through the workpiece;
a broaching tool movably arranged in the spindle to machine an inner surface of the hole in the workpiece; and
a moving mechanism for moving the broaching tool in a horizontal direction,
wherein the moving mechanism comprises:
a moving block fixed to the broaching tool;
an actuator arranged opposite to the chucking mechanism with respect to the spindle to move the moving block in the horizontal direction; and
a spring for returning the moving block, which is moved toward the workpiece by the actuator, to an original position.

9. The lathe of claim 8, wherein the chucking mechanism comprises:
a collet arranged in the spindle to chuck the workpiece;
a push pipe movably arranged in the spindle to operate the collet; and
a toggle lever arranged on an outer surface of the spindle to move the push pipe.

* * * * *